United States Patent [19]
Kühn

[11] 3,746,291
[45] July 17, 1973

[54] SUPPORT FOR A NEST OF EXHAUST MANIFOLDS FOR INTERNAL COMBUSTION ENGINES

[75] Inventor: Karl Walter Kühn, Saint-Germain-En-Laye, France

[73] Assignee: Societe D'Etudes De Machines Thermiques, Saint-Denis, France

[22] Filed: Sept. 24, 1971

[21] Appl. No.: 183,441

[30] Foreign Application Priority Data
Oct. 28, 1970 France .............................. 7038887

[52] U.S. Cl. ............... 248/68 R, 180/64 A, 248/24, 248/54 R
[51] Int. Cl. .............................................. F16l 3/22
[58] Field of Search ...................... 248/68 R, 68 CB, 248/24, 20, 21; 138/112, 149; 180/64 A

[56] References Cited
UNITED STATES PATENTS
1,852,363  4/1932  Parent ............................... 248/68 R
2,174,209  9/1939  Genest et al. ........................ 248/20
1,542,267  6/1925  Parker ............................... 248/68 R
2,532,587  12/1950  Williamson ......................... 138/149
2,981,511  4/1961  Suozzo .............................. 248/54 R Primary Examiner—Roy D. Frazier
Assistant Examiner—Rodney H. Bonck
Attorney—Francis T. Carr et al.

[57] ABSTRACT

A support for a cluster of parallel exhaust manifolds for internal combustion engines, bearing upon the engine and comprising a vertical rod consisting of detachable elements each including one a portion of said rod and at least one flexible side arm arranged so that the adjacent arms of two successive elements are in mutual registering relation with respect to a plane extending transversely of said rod so as to hold tightly at least one exhaust manifold therebetween.

11 Claims, 6 Drawing Figures

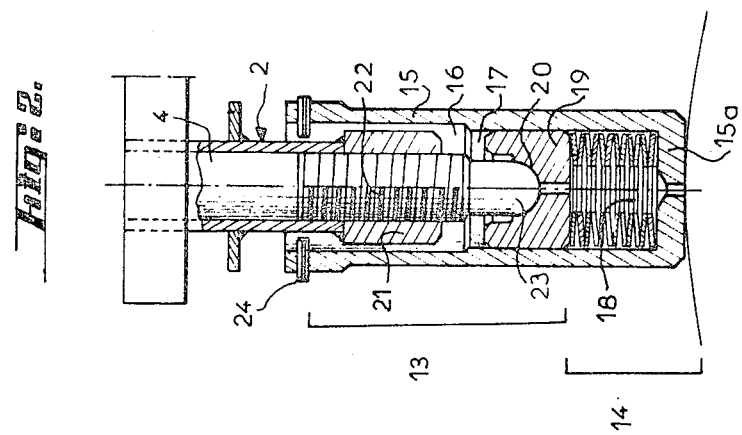
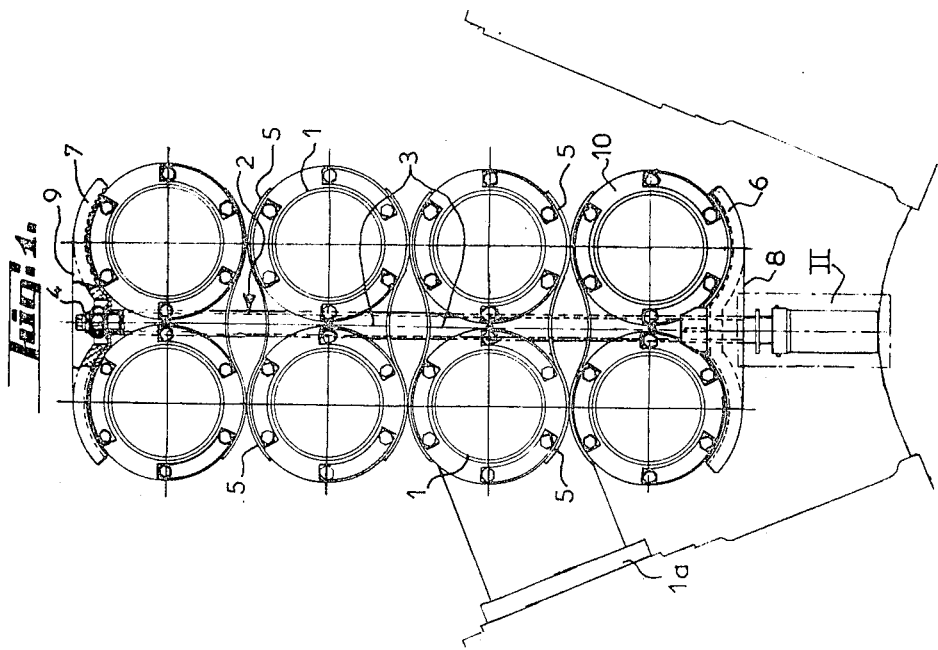

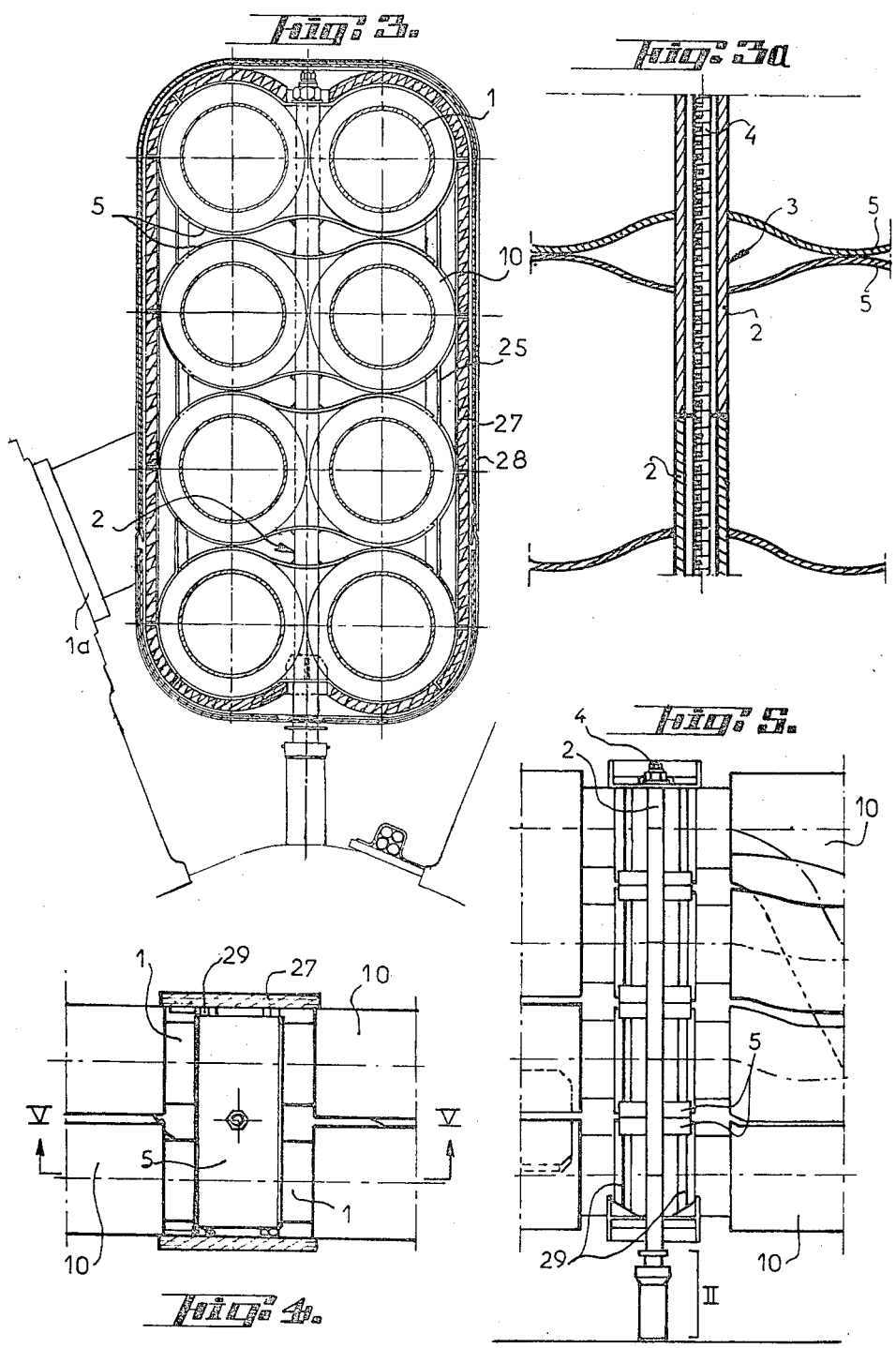

SUPPORT FOR A NEST OF EXHAUST MANIFOLDS FOR INTERNAL COMBUSTION ENGINES

The present invention relates essentially to a device forming a support for holding the whole assembly of exhaust manifolds of an internal combustion engine such as a Diesel engine with cylinders arranged in line or V-shaped cylinders and in particular super-charged by a pressure wave.

Each exhaust manifold consists of a plurality of sections connected to each other by flanges with thermal expansion bellows interposed therebetween. The connecting areas are juxtaposed and superposed in the nest, cluster or bundle of exhaust manifolds in common vertical transverse planes and a support or holder is provided at each area.

The device forming the support according to the present invention enables carrying or backing the cluster or package of exhaust manifolds when removing the cylinder heads since possible supports for the flanges connecting to the cylinder heads do not prevent the sagging or collapse of the cluster of pipes under their own weight. With such a device, the collapse or sagging and also any deflection of the manifolds during dismantling of the cylinder heads are avoided, which collapse and/or deflection make the fastening of the exhaust manifolds difficult when refitting the cylinder heads.

For this purpose the device forming the support for a nest or cluster of exhaust manifolds according to the present invention is characterized in that it comprises: a for example substantially vertical rod consisting of a plurality of detachable elements including one section or portion of said rod and at least one for example flexible or resiliently deformable side arm or limb arranged so that the adjacent arms of two successive elements are mutually in registering or symmetrical relation to a plane extending transversely of the rod so as to hold tightly or grip at least one exhaust manifold therebetween.

According to another characterizing feature of the invention, said arms are fastened to said rod and extend freely in overhanging relationship from the latter.

According to still a further characterizing feature of the invention, said arms are curved into a cradle-like configuration so as to conform to said exhaust manifolds.

According to still another characterizing feature of the invention and in the case of an engine with V-shaped cylinders, said arms are arranged in substantially symmetrical relationship on either side of said rod and/or with respect to overlying transverse planes.

According to still a further characterizing feature, the assembly consisting of the exhaust manifolds held or gripped tightly within said arms of the removable elements is covered with a protective insulating lagging or sheathing thus forming a heat insulating jacket for example. The heat insulating jacket or lagging would avoid any fire hazard through ignition of fuel likely to contact the hot pipes in the case of an accidental burst or leakage of a fuel duct or line.

The invention will be better understood and further objects, characterizing features and advantages thereof will appear as the following explanatory description proceeds with reference to the accompanying diagrammatic drawings given by way of example only and wherein :

FIG. 1 shows a cross-sectional view illustrating a cluster of parallel exhaust manifolds supported by the device according to the invention ;

FIG. 2 is a longitudinal section through the resilient base member accommodating the rod of the device according to FIG. 1 ;

FIG. 3 is a view similar to FIG. 1, showing the device forming the support provided with a heat insulating lagging ;

FIG. 3a shows at a larger scale a longitudinal vertical section through a mounted rod element ;

FIG. 4 is a bottom view of the device shown in FIG. 3 as applied to the area of connection of two exhaust manifolds ; and FIG. 5 is a section taken upon the line V—V of FIG. 4.

Referring to the accompanying drawings and more particularly to FIG. 1, the nest, cluster or bundle of exhaust manifolds has been shown at a level where by way of illustration it is arranged as a cluster of four pairs of exhaust manifolds 1 one of which comprises a flange 1a for connection with the cylinder head and extending in substantially parallel relationship between two V-shaped cylinders of an internal combustion engine. The assembly forming the support consists of a central member or tubular rod 2 formed of successive detachable tubular elements 3 stacked one upon another. The whole tubular rod assembly 2 is held together by a tie-rod or brace 4 extending through said tubular element 3 of rod 2 from one end to the other. Each element 3 of the rod is integrally formed with four yielding and resiliently deformable side arms of limbs 5 arranged in symmetrical relationship with respect to the rod 2 in overlying pairs, the said arms 5 being cradle-like and arranged with opposed concavities, so that any two successive adjacent elements 3 are adapted to grip and hold tightly there between a pair of exhaust manifolds 1.

The same applies to the four pairs of exhaust manifolds 1.

The end cradle-like arms 6 and 7 at the top and bottom ends, respectively, have a configuration similar to that of the other cradle-like arms 5, respectively, except for their thickness which is greater to provide a better bearing support for the assembly of eight manifolds 1.

The cradle-like arm 6 at its lower end is carried by a vertically arranged metal bracket 8 rigidly connected to the lower element 3 of the rod 2 so as to carry the cradle-like arm 6 and to increase its tight supporting engagement with the two lowermost respective manifolds. Each cradle-like arm 7 at the upper end is held by a bracket 9 similar to bracket 8 and conforming to in contour the cradle-like arm 7 after tightening of the tie-rod 4 of rod 2.

It should be noted that before mounting the manifolds 1 on the tie rod support, each manifold 1 is wrapped in a heat insulating lagging 10.

The whole assembly of manifolds 1 carried in the support device is mounted upon a resilient base member 11 shown in more detail in FIG. 2.

This base member II consists of a block 13 and a resilient cushion 14. The block 13 comprises in particular a steel socket 15 the bottom 15a of which bears directly upon the engine and which is formed with two differently diametered bores 16 and 17. Inside of the socket 15 at the lower portion thereof, that is within the smaller diametered bore 17 is positioned, for example, comprising a resilient cushion 14 a stack of cup-shaped springs or disk springs or washers 18. Above said stack 18 a dished seat or footing is provided comprising a recess 20 centrally thereof. The lower end 21 of the rod 2 is screw-threaded and screwed into the block onto the threaded end 22 of the tie-rod 4 the head 23 of which engages the recess 20.

Stop means 24 engageable with the member 21 prevent the socket 15 from separating from the rod 2. It is easily conceivable that such an arrangement of the resilient base member enables the adjustment of the rod 2 of the whole support assembly through a simple screwing operation inside the block bearing upon the engine.

The fitting of the manifold sections in their respective supports is carried out as follows:

At the beginning the mounting and assembling of the lower exhaust manifold sections 1 should be carried out. To this end, for each support the resilient base member together with its component elements 13, 14, 19, 24, the lower cradle-like support 6 and the tie-rod 4 should be positioned previously. To begin with, the tie-rod 4 should be unscrewed sufficiently to allow the engagement of the dogs for positioning the lower cradle 6 longitudinally on either side of the flanges. The tie-rod should then be screwed again until the cradle is brought in engagement with the flanges and the assembly is given a stable position.

The erection is continued for the other rows by interposing each time an element with flexible arms 3. This enables to accurately position the flanges of the connecting pipings in front of the cylinder heads.

After having fitted all the manifold sections 1 on all supports, each tie-rod 4 is screwed to compensate for the squeezing of the disk springs due to the weight of the manifolds as well as for the expansions of the latter in operation.

The upper cradle 7 is then positioned and locked without putting the tie-rod 4 (to be locked against rotation) out of adjustment.

Preferably the assembly of manifolds 1, being thus fitted in all the supporting devices of the invention, is wrapped with a first metal sheet 25 forming a spacer means for a heat insulating lagging 27 and finally with a second shielding metal sheet 28 (FIG. 3) forming a hood; this metal sheet 28 as well as the lagging 27 consist of several parts to enable a partial disassembling according to the position of the expansion bellows between the manifold sections to which access is desirably provided in case of dismantling.

Such a support assembly may also be provided on some other areas of the cluster of manifolds and in particular in the areas of connection between two manifolds 1 through joints.

This is shown by the sectional views in FIGS. 4 and 5. Above the joints are provided expansion compensators (not shown). In such a case, the cradles 5 are located above the connecting joints between the connecting flanges 29 of the manifolds 1 without adding any heat insulating jacket or shell 10 in this area.

From the description just made it appears that the supporting device is very easily removable partially or fully.

It becomes thus possible to release, to free or to clear only one manifold from the support without displacing the other, the latter being not likely to collapse or to sag since they are properly supported.

Moreover such a support, owing to its heat insulating lagging, avoids the fire hazards in case of burst or leakage of a fuel line.

It should be understood that the invention is not at all limited to the embodiment described and shown which has been given by way of example only. In particular it comprises all the means forming technical equivalents to the means described as well as their combinations if same are carried out according to the gist of the invention as defined in the appended claims.

What is claimed is:

1. A device for supporting a cluster of exhaust manifolds of an internal combustion engine, in at least locally substantially parallel relationship and arranged in at least two substantially upright juxtaposed rows of overlying pipes, said device locally supporting said pipes at the parallel extending sections thereof and comprising an upstanding tie-rod passing between said rows of pipes transversely thereof, a stack of detachable pipe-holding members with sleeve-like tubular body portions strung with a sliding fit on said tie-rod in mutually engaging relationship and tightly secured thereon by nut means screw-threaded endwise on said tie-rod, each pipe-holding member including resiliently flexible clamping arm means rigidly connected to its body portion and projecting laterally from opposite sides therefrom in substantially symmetrical relation thereto, said clamping arm means being curved in a common plane extending through the axis of said body portion and all clamping arm means of said stack of pipe-holding members being aligned in substantially registering relationship in said common plane in two upstanding rows on either side of said tie-rod, any two aligned overlying clamping arm means belonging to any two adjacent successive pipe-holding members, respectively, being disposed in mutually confronting inverted spaced relation to each other and substantially symmetrical with respect to a transverse plane extending at right angles to said common plane, with their curvatures conforming substantially to the cross-sectional curvatures of said pipes, whereby the pairs of aligned overlying consecutively mutually reversely facing clamping arm means are adapted to embrace and grip respective pipes therebetween, and wherein said stack comprises two opposite end pipe-holding members and a plurality of intermediate pipe-holding members, each end pipe-holding member being formed with bracket means backing the clamping arms thereof, the top end pipe-holding member being engaged by a fastening nut carried by the upper end of said tie-rod whereas the bottom end pipe-holding member is adjustably screw-threaded on the lower end portion of said tie-rod, said lower end portion of said tie-rod extending with clearance into the bore of a hollow socket-like base element open at its top and closed at its bottom by a flat end wall and bearing with its bottom end directly upon said engine, said lower end portion being freely supported on a movable pad slidingly mounted in said bore and resting on a resiliently deformable cushion interposed between said pad and said bottom end wall of said base element inside thereof.

2. A device according to claim 1, wherein said lower end of said tie-rod terminates in a rounded tip engaging a complementary mating central recess formed in said pad to be seated thereby.

3. A device according to claim 1, wherein said bottom end pipe-holding member freely extends with its lower end into said base element and is engageable with stop means provided on said base element for preventing same from separating from the pipe-holding member and tie-rod assembly.

4. A device according to claim 2, wherein said bottom end pipe-holding member freely extends with its lower end into said base element and is engageable with stop means provided on said base element for preventing same from separating from the pipe-holding member and tie-rod assembly.

5. A device according to claim 1, wherein said cushion consists of a stack of pairs of coaxially oppositely disposed cup-shaped disk springs guidingly accommodated in said bore of said base element.

6. A device according to claim 2, wherein said cushion consists of a stack of pairs of coaxially oppositely disposed cup-shaped disk springs guidingly accommodated in said bore of said base element.

7. A device according to claim 3, wherein said cushion consists of a stack of pairs of coaxially oppositely disposed cup-shaped disk springs guidingly accommodated in said bore of said base element.

8. A device according to claim 4, wherein said cushion consists of a stack of pairs of coaxially oppositely disposed cup-shaped disk springs guidingly accommodated in said bore of said base element.

9. A device according to claim 1, wherein said each pipe is wrapped in a heat insulating shell-like jacket and the bundle of supported pipes is wrapped in a first sheet-like casing surrounded by a layer of heat insulating lagging which is itself enclosed in a second sheet-like casing forming a shield.

10. A device according to claim 9, provided at the joints of flanged connection between successive pipe sections in each pipe, all of said joints being arranged at a same location in a same transverse plane wherein said pipes are devoid of said jackets adjacent to said location and said clamping arms are positioned substantially at said joints.

11. A device as per claim 1 wherein said clamping arm means of each intermediate pipe holding member comprises two adjacent pairs of transversely registering resiliently flexible clamping arms connected to said tubular body portion intermediate its ends, the two overlying clamping arms on either side of said body portion having their concavities facing in opposite directions respectively lengthwise of said tie rod.

* * * * *